United States Patent Office 3,020,759
Patented Feb. 13, 1962

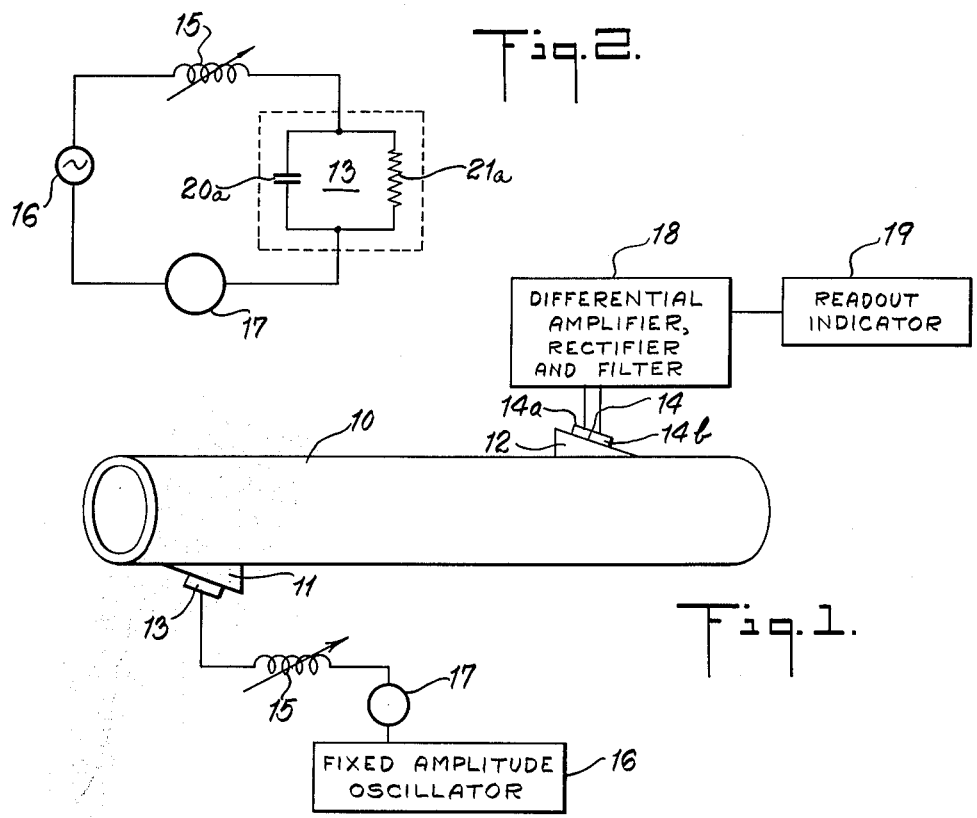
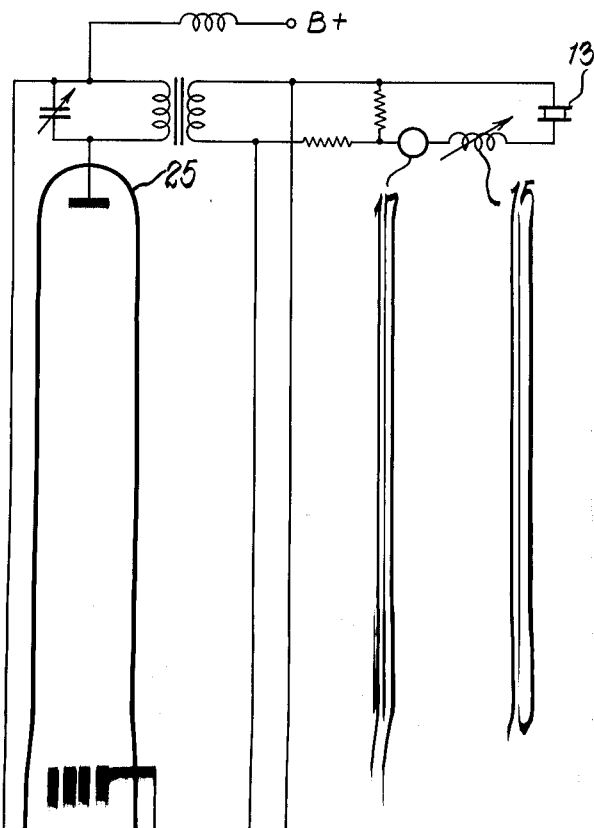

3,020,759
ULTRASONIC FLOWMETER
Walter Welkowitz, Metuchen, N.J., assignor to Gulton Industries, Inc., Metuchen, N.J., a corporation of New Jersey
Filed Feb. 19, 1957, Ser. No. 641,122
7 Claims. (Cl. 73—194)

My invention relates to ultrasonic flowmeters which may be utilized to measure the mass flow of a fluid in a pipe or similar container.

Present day flowmeters may be used to measure fluid flow velocity and it is then necessary to convert these measurements to mass flow in order for the measurements to be useful. These conversions are most generally carried out by using special conversion tables, slide rules or similar devices. More elaborate techniques using computers in conjunction with velocity flowmeters so as to obtain direct readings in mass flow are often employed.

There is a distinct need for a simple flowmeter which will measure mass flow per unit time directly. Such a device will find use in aircraft wherein it is important to obtain indications of fuel consumption in pounds per hour and in other vehicles, ships, missiles and like units in which knowledge of the fluid mass flow per unit time is useful and desirable.

In addition, presently known flowmeters require that corrections be made to compensate for the variations in fluid temperature on which the sound velocity is dependent and for the fluid density. Many elaborate techniques and devices for making these corrections have been used and described, most of which require auxiliary transducers and complex circuitry. There is a need for a simple device which may be used to make fluid mass-flow measurements which are accurate and essentially direct reading.

Accordingly, it is a principal object of my invention to provide an economical device for measuring fluid mass flow per unit time.

It is a further object of my invention to provide such a device which uses continuous wave ultrasound for such measurements.

It is a still further object of my invention to include means for applying corerctions for the fluid density and temperature in the driving circuit.

It is a still further object of my invention to utilize a differential transducer for detecting the change in the position of the ultrasonic beam with fluid flow.

These and other objects, advantages and features will become more apparent as the description proceeds when considered in view of the accompanying drawings in which:

FIGURE 1 is a block diagram of a preferred embodiment of my invention,

FIGURE 2 is a simplified schematic diagram of the impedance correction circuit, and FIGURE 3 is a schematic diagram of a fixed amplitude oscillator used in carrying out my invention.

In the drawings, wherein for the purpose of illustration is shown a preferred embodiment of my invention, the numeral 10 designates a pipe (fluid flow-containing means) on which are mounted wedges 11 and 12. Transmitting transducer 13 is mounted on wedge 11 so that the waves transmitted by it under excitation from oscillator 16 enter pipe 10 at an angle of about 15° from the direction of the normal to pipe 10. Inductance 15 serves as the impedance correction circuit and is connected in series with the output of oscillator 16 and transmitting transducer 13 and is adjusted by means of meter 17 so that it is in resonance with the clamped capacitance 20a of transmitting transducer 13 at the oscillator frequency. Differential transducer 14 is mounted on wedge 12. The outputs of elements 14a and 14b, which together constitute differential transducer 14, are fed to differential amplifier, rectifier and filter 18 whose output in turn is fed to readout indicator 19. Capacitance 20a and resistance 21a together comprise the equivalent circuit, at resonance, of transducer 13.

Fixed amplitude oscillator 16 comprises electron tube 25 whose frequency is controlled by bridge circuit 20. Bridge 20 comprises piezoelectric crystal 21, thermally controlled resistor 22, and resistors 23 and 24. The output of this oscillator circuit is of constant amplitude and the theory and operation are more fully described by L. A. Meacham in the Proceedings of the Institute of Radio Engineers, volume 26, No. 10, for October 1938 at pages 1278 to 1294.

Transducers 13 and 14 may be made of any electromechanically sensitive material. I prefer to use quartz plates or plates of polarized electrostrictive material such as barium titanate. However, other polarized electrostrictive materials, natural or artificial piezoelectric materials or magnetostrictive materials may also be used for the active transducer elements.

Indicator 17 may be any type of R.-F. indicator which will display an indication of the series resonance of the clamped capacitance of transmitting transducer 13, capacitance 20a, and inductance 15 such as, an R.-F. ammeter, neon bulb, cathode ray tube or similar devices.

Differential amplifier, rectifier and filter 18, the details of which are not shown, comprises, preferably, two electron amplifiers whose outputs are connected in push-pull, a rectifier circuit which is fed from the amplifiers, and a low-pass filter circuit. The input of each of the electron amplifiers is fed by one half of differential transducer 14. Readout indicator 19 may be a meter, a cathode ray electric eye, a cathode ray oscilloscope or any other device which will display voltages or voltage differences.

In operation, my invention may be employed to indicate mass flow (for example, pounds per hour of flow) directly. My flowmeter uses C.W. ultrasonic energy in conjunction with a differential transducer and is an improvement of the flowmeter described by Lucien A. Petermann in his co-pending application Serial No. 551,598, now Patent No. 2,874,568. The ultrasonic beam is transmitted from transmitting transducer 13 under excitation from oscillator 16 and enters pipe 10 at an angle of about 15° to the normal to pipe 10 and is reflected several times at an oblique angle in pipe 10 and is received by differential transducer 14. Differential transducer 14 is adjusted so that there are equal outputs generated by elements 14a and 14b when there is no fluid flow in pipe 10. When there is fluid flow in pipe 10, the ultrasonic beam is deflected, resulting in a difference in output between elements 14a and 14b. This difference is amplified, rectified and filtered in differential amplifier, rectifier and filter 18 and fed to indicator 19. The use of a number of reflections of the ultrasonic beam across pipe 10 effectively integrates the flow rate in the entire pipe for either turbulent or laminar flow.

In order to obtain a direct measurement of mass flow, corrections must be made in the system for the fluid temperature on which the sound velocity is dependent and for the fluid density. FIGURE 2 serves to illustrate the theory underlying the technique I employ to make these corrections. Oscillator 16 is a fixed amplitude oscillator which supplies a constant driving voltage $E_o$. Transducer 13 has an impedance which, at resonance, consists of two parallel components, capacitance 20a and resistance 21a. The value of resistance 21a is substantially proportional to the acoustic impedance of the fluid medium. Inductance 15 is varied until maximum R.-F. current is displayed on indicator 17. At this point of resonance, the inductive reactance of inductance 15 is equal to the capacitive reactance of capacitance 20a. Then the output driving voltage $E_d$ is essentially proportional to the inpedance $p_0V_c$ where $p_0$ is the fluid density and $V_c$ is the ultrasonic velocity of propagation in the fluid. The output driving voltage $E_d$ determines the excitation which is applied to transmitting transducer 13 and is equal to $K_1p_0V_c$, where $K_1$ is a constant.

The ultrasonic beam is transmitted across pipe 10, is reflected several times within pipe 10 and received by differential transducer 14. If the original angle of the beam (no fluid flow) with respect to a pipe diameter is $a_0$, then the shift in angle with fluid flow is given approximately by $$a_1 - a_0 = \frac{V}{V_c}$$

where $a_1$ is the angle with fluid flow, $V_c$ is the ultrasonic velocity of propagation, and $V$ is the fluid velocity.

The voltage applied to readout indicator 19, $E_1$, is proportional to this beam deflection and therefore $$E_1 = K_2 \frac{V}{V_c}$$

where $K_2$ is a constant.

The output voltage at readout indicator 19, $E_o$, varies as the product of $E_d$ and $E_1$ or $$E_o = K_1 p_0 V_c . K_2 \frac{V}{V_c} = K p_0 V$$

where $K$ is a third constant. Therefore, the measured output at readout indicator 19 is a measure of mass flow since it is proportional to the density and the flow velocity and is independent of temperature changes because it does not contain the ultrasonic velocity of propagation, $V_c$, as a factor.

While I have described my invention by means of specific examples and in a specific embodiment, I do not wish to be limited thereto, for obvious modifications will occur to those skilled in the art without departing from the spirit of my invention or the scope of the subjoined claims.

Having thus described my invention, I claim:

1. An ultrasonic flowmeter comprising fluid flow-containing means, fluid in said fluid flow-containing means, constant amplitude oscillator means, an electromechanically sensitive piezoelectric body mounted on said fluid flow-containing means such that ultrasonic vibrations produced in said electromechanically sensitive piezoelectric body by said oscillator means are propagated across said fluid in said fluid flow-containing means, a variable inductance, the output of said oscillator means being applied to said variable inductance in series with said electromechanically sensitive body, means for indicating when said inductance and said electromechanically sensitive piezoelectric body are tuned to resonance, a differential transducer mounted on said fluid flow-containing means and displaced thereon from said electromechanically sensitive piezoelectric body, amplifying means connected to the output of said differential transducer, detecting means and indicating means, the output of said amplifying means being connected to said detecting means and thence to said indicating means.

2. An ultrasonic flowmeter as described in claim 1 wherein said electromechanically sensitive piezoelectric body is ceramic.

3. An ultrasonic flowmeter as described in claim 2 wherein said electromechanically sensitive piezoelectric body is composed largely of barium titanate.

4. An ultrasonic flowmeter as described in claim 1 wherein said differential transducer is piezoelectric.

5. An ultrasonic flowmeter as described in claim 4 wherein said differential transducer is ceramic.

6. An ultrasonic flowmeter as described in claim 5 wherein said differential transducer is composed largely of barium titanate.

7. In a flowmeter of the class comprising fluid flow-containing means, constant amplitude oscillator means, a piezoelectric transducer mounted on said fluid flow-containing means for propagating ultrasonic waves across said fluid flow-containing means when said transducer is excited by said oscillator means and means for detecting the deflection of said ultrasonic waves with fluid flow, the improvement which comprises a variable inductance in series with said piezoelectric transducer and means for indicating when said piezoelectric transducer and said variable inductance are in resonance with the excitation supplied by said oscillator means whereby the output voltage driving said piezoelectric transducer is proportional to the acoustic impedance of the fluid in said fluid flow-containing means.

References Cited in the file of this patent

UNITED STATES PATENTS

| | | |
|---|---|---|
| 2,051,032 | Eddy | Aug. 18, 1936 |
| 2,274,262 | Wolff | Feb. 24, 1942 |
| 2,480,646 | Grabau | Aug. 30, 1949 |
| 2,514,235 | Genin et al. | July 4, 1950 |
| 2,711,646 | Mendousse | June 28, 1955 |
| 2,869,357 | Kritz | Jan. 20, 1959 |
| 2,874,568 | Petermann | Feb. 24, 1959 |